(12) United States Patent
Ingram-Tedd et al.

(10) Patent No.: US 11,589,520 B2
(45) Date of Patent: Feb. 28, 2023

(54) GROWING SYSTEMS AND METHODS

(71) Applicant: OCADO INNOVATION LIMITED, Hatfield (GB)

(72) Inventors: Andrew John Ingram-Tedd, Hatfield (GB); Lars Sverker Ture Lindbo, Hatfield (GB); Mark Stubbs, Hatfield (GB); David Gerken, Hatfield (GB)

(73) Assignee: OCADO INNOVATION LIMITED, Hatfield (GB)

( * ) Notice: Subject to any disclaimer, the term of this patent is extended or adjusted under 35 U.S.C. 154(b) by 143 days.

(21) Appl. No.: 16/333,397

(22) PCT Filed: Sep. 15, 2017

(86) PCT No.: PCT/EP2017/073268
§ 371 (c)(1),
(2) Date: Mar. 14, 2019

(87) PCT Pub. No.: WO2018/050816
PCT Pub. Date: Mar. 22, 2018

(65) Prior Publication Data
US 2019/0246571 A1 Aug. 15, 2019

(30) Foreign Application Priority Data

Sep. 15, 2016 (GB) ................................. 1615751

(51) Int. Cl.
*A01G 9/14* (2006.01)
*A01G 9/24* (2006.01)
(Continued)

(52) U.S. Cl.
CPC .............. *A01G 9/143* (2013.01); *A01G 9/023* (2013.01); *A01G 9/246* (2013.01); *A01G 9/247* (2013.01);
(Continued)

(58) Field of Classification Search
CPC . A01G 9/00; A01G 9/02; A01G 9/249; A01G 9/20; A01G 9/26; A01G 9/143;
(Continued)

(56) References Cited

U.S. PATENT DOCUMENTS 2,701,065 A 2/1955 Bertel
4,734,830 A * 3/1988 Cristian ................. A01G 7/045
362/35

(Continued)

FOREIGN PATENT DOCUMENTS

CN 201099477 Y 8/2008
CN 201888130 U 7/2011
(Continued)

OTHER PUBLICATIONS

International Search Report (PCT/ISA/210) dated Nov. 17, 2017, by the European Patent Office as the International Searching Authority for International Application No. PCT/EP2017/073268.
(Continued)

*Primary Examiner* — Peter M Poon
*Assistant Examiner* — Carly W. Lynch
(74) *Attorney, Agent, or Firm* — Buchanan Ingersoll & Rooney PC

(57) ABSTRACT

A growing system is described where plants are grown in containers and the containers are stored in stacks. Above the stacks runs a grid network of tracks on which load handling devices run. The load handling devices take containers from the stacks and deposit them at alternative locations in the stacks or deposit them at stations where goods may be picked out. The containers may be provided with one or more of the following services: power, power control, heating, lighting, cooling, sensing means, data logging means, growing means, water and nutrients.

10 Claims, 11 Drawing Sheets

(51) Int. Cl.
  *A01G 9/02* (2018.01)
  *A01G 9/26* (2006.01)
  *A01G 31/06* (2006.01)
  *A01K 1/00* (2006.01)
  *A01K 1/03* (2006.01)
  *B65G 1/04* (2006.01)

(52) U.S. Cl.
  CPC ............ *A01G 9/249* (2019.05); *A01G 9/26* (2013.01); *A01G 31/06* (2013.01); *A01K 1/0076* (2013.01); *A01K 1/031* (2013.01); *B65G 1/0464* (2013.01); *Y02A 40/25* (2018.01); *Y02P 60/21* (2015.11)

(58) Field of Classification Search
  CPC .......... A01G 9/023; A01G 9/24; A01G 9/246; A01G 9/247; A01G 7/045; A01G 31/045; A01G 31/06; A01K 1/0076; A01K 1/031
  See application file for complete search history.

(56) References Cited

U.S. PATENT DOCUMENTS

| | | | |
|---|---|---|---|
| 6,654,662 B1 | 11/2003 | Hognaland | |
| 8,984,806 B2 * | 3/2015 | Uchiyama | A01G 9/24 47/17 |
| 9,974,252 B2 | 5/2018 | Aykroyd et al. | |
| 10,264,737 B2 | 4/2019 | Johansson | |
| 2009/0301979 A1 | 12/2009 | Isozaki et al. | |
| 2014/0026474 A1 * | 1/2014 | Kulas | A01G 9/16 47/1.7 |
| 2014/0069007 A1 | 3/2014 | Chen et al. | |
| 2014/0344099 A1 * | 11/2014 | Fok | A01G 13/0268 705/26.5 |
| 2016/0100530 A1 | 4/2016 | Hwang | |
| 2016/0140488 A1 | 5/2016 | Lindbo | |
| 2016/0157439 A1 | 6/2016 | Greene et al. | |
| 2016/0165810 A1 | 6/2016 | Johansson | |
| 2016/0194151 A1 | 7/2016 | Lindbo et al. | |
| 2016/0295820 A1 | 10/2016 | Aykroyd et al. | |

FOREIGN PATENT DOCUMENTS

| | | | | |
|---|---|---|---|---|
| CN | 102771345 A | 11/2012 | | |
| CN | 202697344 U | 1/2013 | | |
| CN | 202757012 U | 2/2013 | | |
| CN | 103609353 A | 3/2014 | | |
| CN | 203907346 U | 10/2014 | | |
| CN | 204201635 U | 3/2015 | | |
| CN | 104542065 A | 4/2015 | | |
| CN | 205082295 U * | 3/2016 | ............ | A01G 7/04 |
| CN | 105491876 A | 4/2016 | | |
| CN | 105873434 A | 8/2016 | | |
| CN | 106287465 A * | 1/2017 | ............ | A01G 7/04 |
| EP | 0205330 A2 | 12/1986 | | |
| EP | 0767113 A2 | 4/1997 | | |
| EP | 1037828 A1 | 9/2000 | | |
| EP | 1388708 A2 * | 2/2004 | ............ | A01G 7/045 |
| EP | 1859673 A1 | 11/2007 | | |
| GB | 2514930 A | 12/2014 | | |
| GB | 2516515 A | 1/2015 | | |
| GB | 2520104 A | 5/2015 | | |
| GB | 2527543 A | 12/2015 | | |
| GB | 2541055 A | 2/2017 | | |
| JP | 2011097852 A | 5/2011 | | |
| JP | 2013051942 A | 3/2013 | | |
| RU | 2009106130 A | 8/2010 | | |
| WO | 2013167907 A1 | 11/2013 | | |
| WO | 2015019055 A1 | 2/2015 | | |
| WO | 2016166311 A1 | 10/2016 | | |
| WO | 2016166353 A1 | 10/2016 | | |

OTHER PUBLICATIONS

Written Opinion (PCT/ISA/237) issued on Nov. 17, 2017, by the European Patent Office as the International Searching Authority for International Application No. PCT/EP2017/073268.
First Office Action dated Dec. 17, 2020, by the Chinese Patent Office in corresponding Chinese Patent Application No. 201780056476.9, and an English Translation of the Office Action. (12 pages).
Office Action (Communication) dated Dec. 2, 2020, by the European Patent Office in corresponding European Patent Application No. 17767835.6. (18 pages).
Office Action (Notice of Reasons for Refusal) dated Oct. 6, 2020, by the Japanese Patent Office in corresponding Japanese Patent Application No. 2019-514709, and an English Translation of the Office Action. (6 pages).
Search Report dated Mar. 13, 2017, by the Great Britain Patent Office in corresponding Great Britain Application No. GB1615751.3. (5 pages).
Search Report dated Mar. 15, 2018, by the Great Britain Patent Office in corresponding Great Britain Application No. GB1714873.5. (5 pages).
Search Report dated Sep. 6, 2017, by the Great Britain Patent Office in corresponding Great Britain Application No. GB1615751.3. (3 pages).
Written Opinion dated Apr. 16, 2020, by the Intellectual Property Office of Singapore in corresponding Application No. 11201902287W. (6 pages).
The extended European Search Report dated Feb. 23, 2022, by the European Patent Office in corresponding European Application No. 21212102.4. (12 pages).
First Office Action dated Nov. 24, 2021, by the Japanese Patent Office in corresponding Japanese Patent Application No. 2021-088422, and an English Translation of the Office Action. (7 pages).
Office Action (Notification of Reason for Refusal) dated Nov. 29, 2021, by the Korean Patent Office in corresponding Korean Patent Application No. 10-2019-7010623, and an English Translation of the Office Action. (15 pages).
Office Action (Second Office Action) dated Sep. 2, 2021, by the China National Intellectual Property Administration in corresponding Chinese Patent Application No. 201780056476.9 and an English Translation of the Office Action. (13 pages).

* cited by examiner

GROWING SYSTEMS AND METHODS

The present invention relates to growing systems and methods. More specifically but not exclusively, it relates to lighting for a mechanized plant growing system.

The present application claims priority from UK Patent Application No. GB 1615751.3 filed on 15 Sep. 2016, the content of which is hereby incorporated by reference.

Additionally, the subject matter of UK Patent Application Numbers GB1606678.9, GB1606684.7 and GB1606679.7 is hereby incorporated by reference.

Conventional systems and methods for growing certain crops are well known. Most require large areas of land and need to be positioned in appropriate locations for the conditions required for the crops to be grown.

More recently, advanced farming techniques such as hydroponics have led to the ability to grow high quality crops indoors with very high utilization of lighting, water and fertilizer. These systems have however been less efficient in terms of land use, capital and labor. The present invention describes a method for dramatically improving these efficiencies.

Some commercial and industrial activities require systems that enable the storage and retrieval of a large number of different products. One known type of system for the storage and retrieval of items in multiple product lines involves arranging storage containers or containers in stacks on top of one another, the stacks being arranged in rows. The storage containers or containers are accessed from above, removing the need for aisles between the rows and allowing more containers to be stored in a given space.

Methods of handling containers stacked in rows have been well known for decades. In some such systems, for example as described in U.S. Pat. No. 2,701,065, to Bertel comprise freestanding stacks of containers arranged in rows in order to reduce the storage volume associated with storing such containers but yet still providing access to a specific container if required. Access to a given container is made possible by providing relatively complicated hoisting mechanisms which can be used to stack and remove given containers from stacks. The cost of such systems are, however, impractical in many situations and they have mainly been commercialized for the storage and handling of large shipping containers.

The concept of using freestanding stacks of containers and providing a mechanism to retrieve and store specific containers has been developed further, for example as described in EP 0 767 113 B to Cimcorp. '113 discloses a mechanism for removing a plurality of stacked containers, using a robotic load handler in the form of a rectangular tube which is lowered around the stack of containers, and which is configured to be able to grip a container at any level in the stack. In this way, several containers can be lifted at once from a stack. The movable tube can be used to move several containers from the top of one stack to the top of another stack, or to move containers from a stack to an external location and vice versa. Such systems can be particularly useful where all of the containers in a single stack contain the same product (known as a single-product stack).

In the system described in '113, the height of the tube has to be as least as high as the height of the largest stack of containers, so that that the highest stack of containers can be extracted in a single operation. Accordingly, when used in an enclosed space such as a warehouse, the maximum height of the stacks is restricted by the need to accommodate the tube of the load handler.

EP 1037828 B1 (Autostore) the contents of which are incorporated herein by reference, describes a system in which stacks of containers are arranged within a frame structure. A system of this type is illustrated schematically in FIGS. 1 to 4 of the accompanying drawings. Robotic load handling devices can be controllably moved around the stack on a system of tracks on the upper most surface of the stack.

Other forms of robotic load handling device are further described in, for example, Norwegian patent number 317366, the contents of which are incorporated herein by reference. FIGS. 3(a) and 3(b) are schematic perspective views of a load handling device from the rear and front, respectively, and FIG. 3(c) is a schematic front perspective view of a load handling device lifting a container.

A further development of load handling device is described in UK Patent Application No 1314313.6 (Ocado) where each robotic load handler only covers one grid space, thus allowing higher density of load handlers and thus higher throughput of a given size system.

In such known storage systems a large number of containers are stacked densely. The containers are conventionally used to store goods to supply online grocery orders picked by robots.

Such a system may be used to grow plants and, indeed, other living organisms. Such a system is described in UK Patent Application No GB 1606678.9 (Ocado Innovation Limited).

The system therein discloses a storage-type vertical farming system that may be used to grow plants in individual containers, the sheer number of containers enabling such crops to be mass produced in a much smaller area of land than would be required using conventional growing techniques.

The above-mentioned application also discloses the ability to provide services to the containers, either individually or via the framework of the system. Depending on the services provided in individual containers, the contents may be monitored for data relating to the contents of the container to be relayed to a central processing system. The data transmitted may provide information on the condition of the container, the contents of the container or may provide information on adjacent containers to condition monitor the entire storage system. Furthermore, in this way, the containers may be lit, heated or cooled as required by the specific contents of the container.

Furthermore, the application discloses individual containers within the storage system being provided with services in addition to goods. Furthermore, individual containers within the storage system may not contain goods but may contain services for provision to other containers or to monitor the condition of the system.

In order to use such a system for effectively growing crops or other living organisms, it may be necessary for the crops or organisms within the containers to be lit via suitable wavelength lighting.

In known vertical farming systems, the crops being grown are typically grown in large trays with large lighting arrays mounted thereabove. In the densely packed system described above, the presence of the crops in a series of stacked containers prevents use of such large area lighting solutions.

In a system utilizing vertically stacked bins, it is highly beneficial to be able to mount the lights adjacent to the bins and shine the light inside. The challenge is achieving uniform light distribution. By utilizing the walls of the growing bin and the bottom surface of the bin above, it is possible to achieve reasonable uniformity of light allowing consistent delivery of light to plants growing inside the bin. A cover, top or lid comprising lighting means may be provided for the topmost bin to reflect light back down onto the crop placed by the robots.

According to the invention there is provided a growing system comprising: a first set of substantially parallel rails or tracks and a second set of substantially parallel rails or tracks extending transverse to the first set in a substantially horizontal plane to form a grid pattern comprising a plurality of grid spaces; a plurality of storage containers arranged in stacks, located beneath the grid spaces and within a series of uprights forming a framework; at least one load handling device disposed on the tracks, arranged to move laterally above the stacks, the or each load handling device comprising a lifting device arranged to lift at least one container, or part thereof, from a stack; in which the system comprises a series of lighting means, the lighting means being deployable from a first position adjacent a container in the stacks to a second position above the container, such that the light emitted by the lighting means is evenly distributed across the growing volume of the container.

According to the invention there is further provided a growing system comprising: a first set of substantially parallel rails or tracks and a second set of substantially parallel rails or tracks extending transverse to the first set in a substantially horizontal plane to form a grid pattern comprising a plurality of grid spaces; a plurality of storage containers arranged in stacks, located beneath the grid spaces and within a series of uprights forming a framework; at least one load handling device disposed on the tracks, arranged to move laterally above the stacks, the or each load handling device comprising a lifting device arranged to lift at least one container, or part thereof, from a stack; in which each container comprises a plastics portion, said plastics portion comprising translucent material for transmitting light incident thereon to the growing volume of the container in an even distribution across the container.

According to the invention there is further provided a method of growing organisms within a growing system according to any preceding claim comprising the steps of: providing growing means within a storage container 110; positioning the container 110 within a storage system; providing required light, water and nutrients; moving the containers 110 using at least one robotic load handling device 30 operable on a grid system above the containers 110; wherein the light is provided via lighting means deployable from a first position adjacent the sides of the containers 110 to a second position above the containers 110.

In this way, the present invention overcomes the problems of the prior art lighting systems in stacking system vertical farms and provides a solution that ensures uniform light distribution in a stacked container system, ensuring increased yield of crops, increased efficiency in terms of lighting costs and producing crops unaffected by lighting directionality.

The invention will now be described with reference to the accompanying diagrammatic drawings in which.

Figure 1:
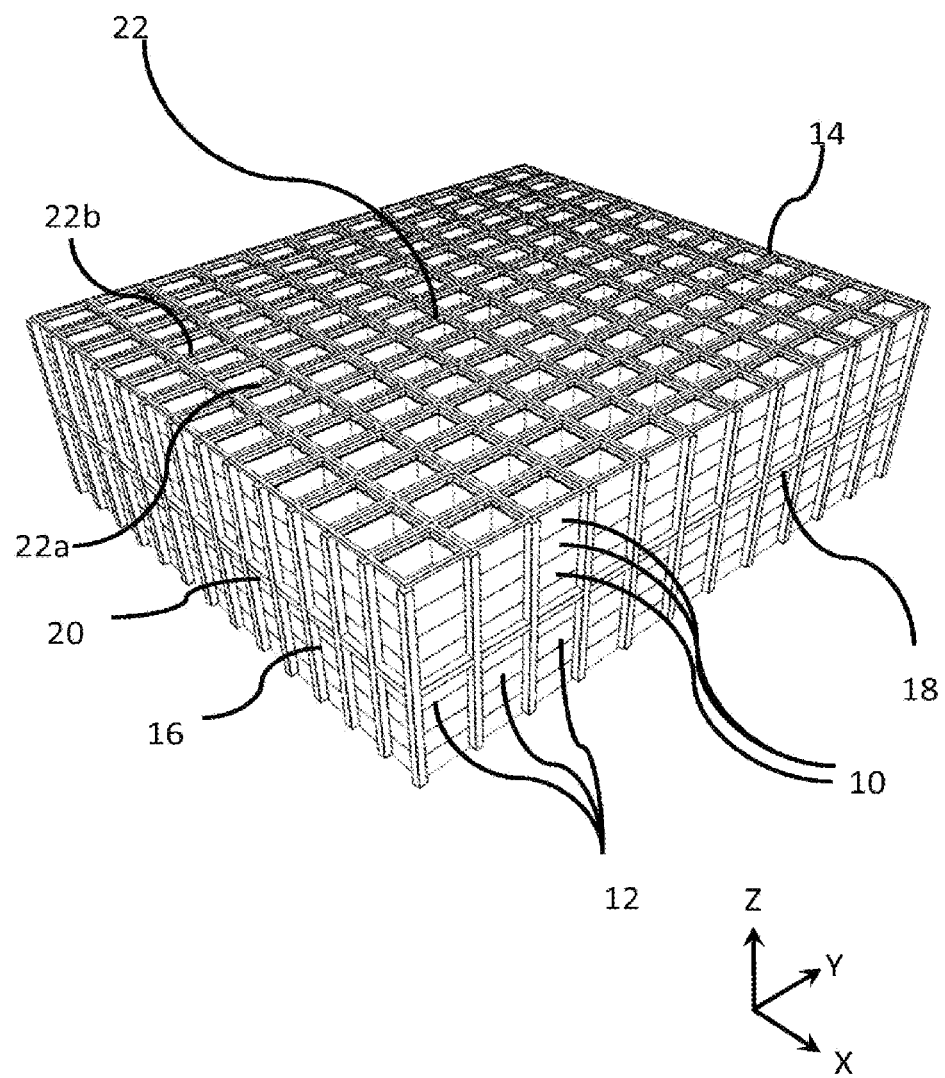
FIG. 1 is a schematic perspective view of a frame structure for housing a plurality of stacks of containers in a storage system.
Figure 2:
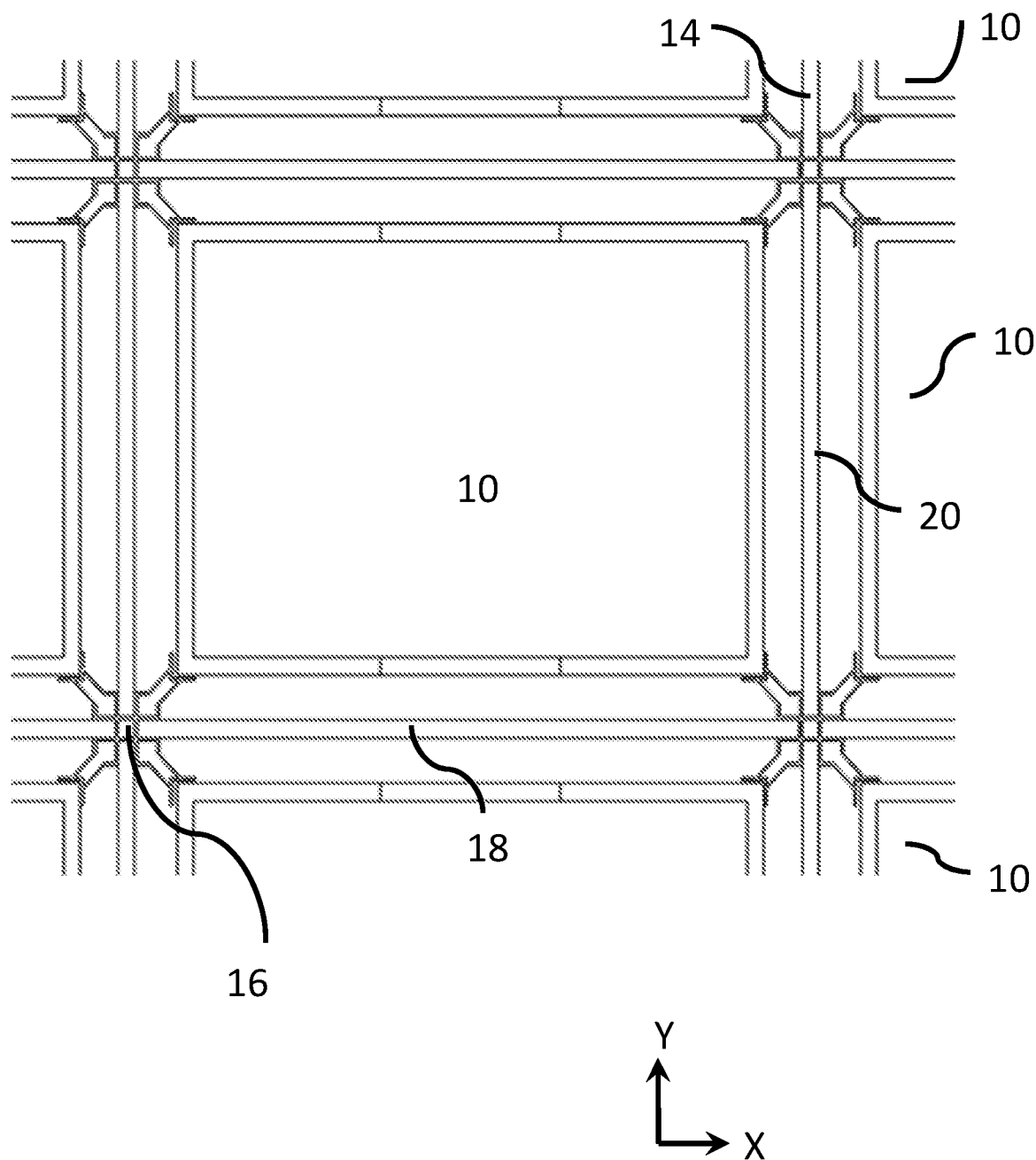
FIG. 2 is a schematic plan view of part of the frame structure of FIG. 1.
Figure 3A:
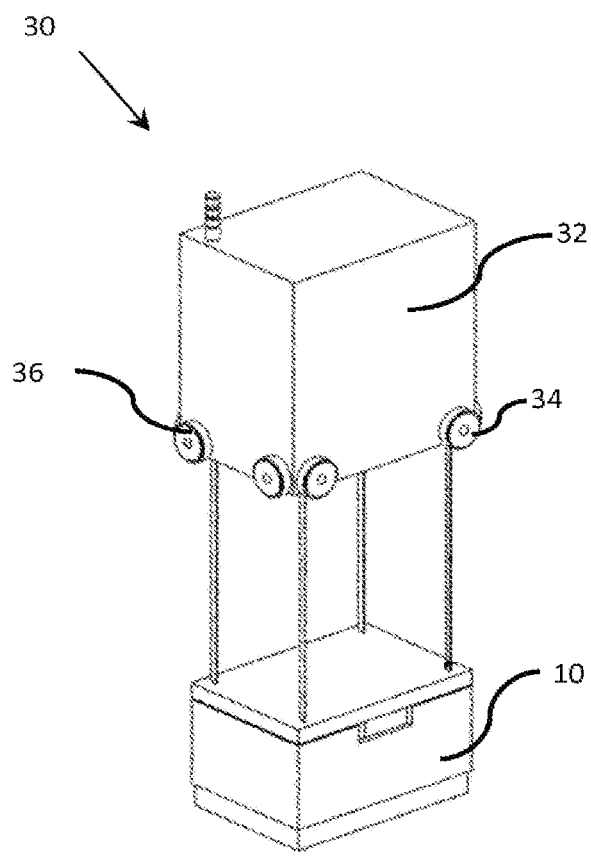
Figures 3B, 3C:
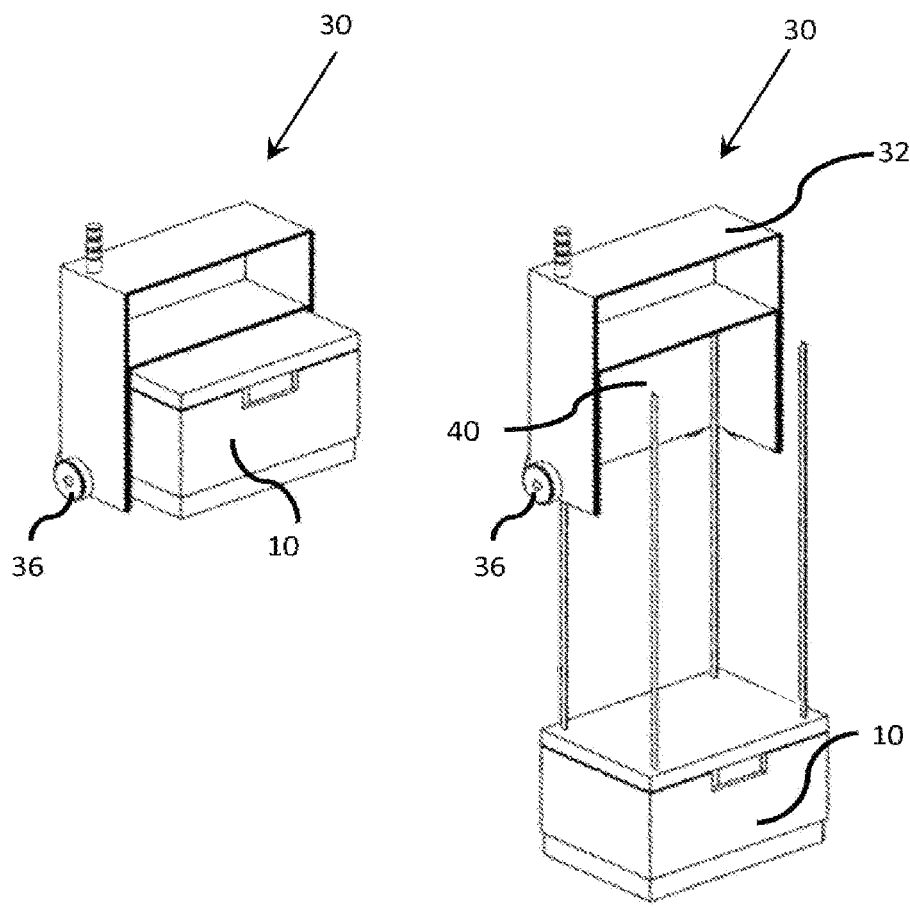
Figure 4:
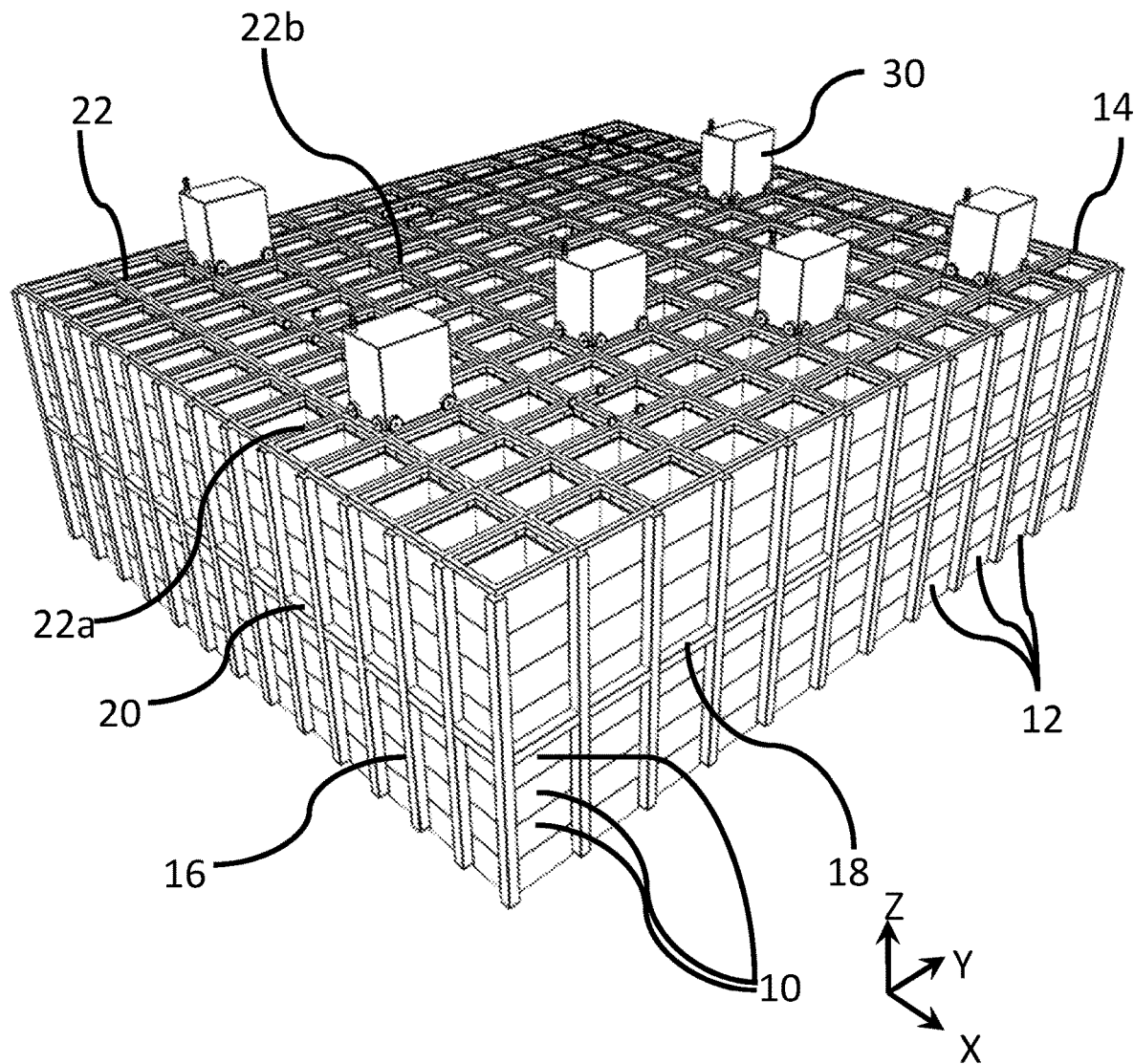

FIGS. 3(a) and 3(b) are schematic perspective views, from the rear and front respectively, of one form of robotic load handling device for use with the frame structure of FIGS. 1 and 2, and FIG. 3(c) is a schematic perspective view of the known load handler device in use lifting a container;

FIG. 4 is a schematic perspective view of a known storage system comprising a plurality of load handler devices of the type shown in FIGS. 3(a), 3(b) and 3(c), installed on the frame structure of FIGS. 1 and 2, together with a robotic service device in accordance with one form of the invention.

Figure 5:
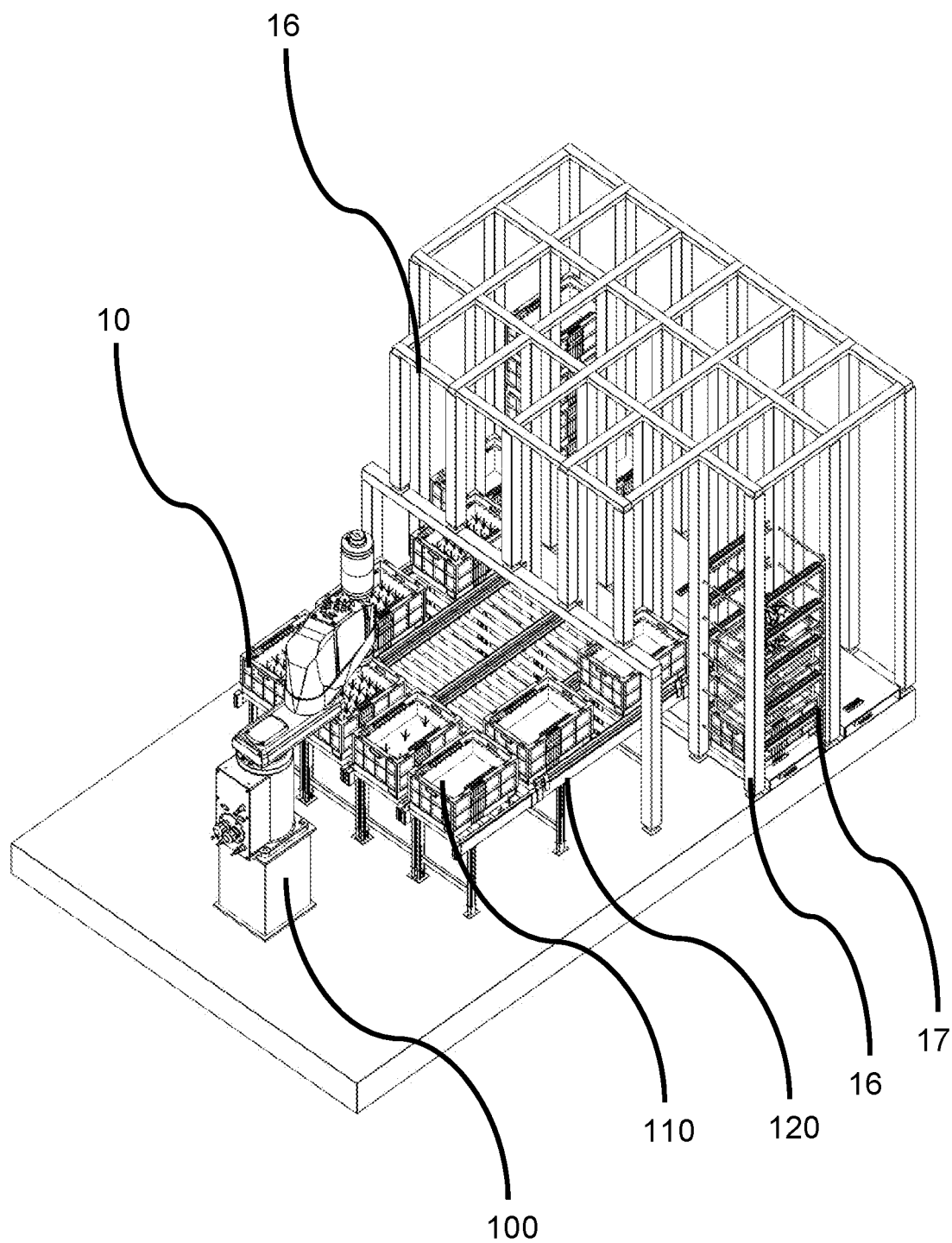
Figure 6A:
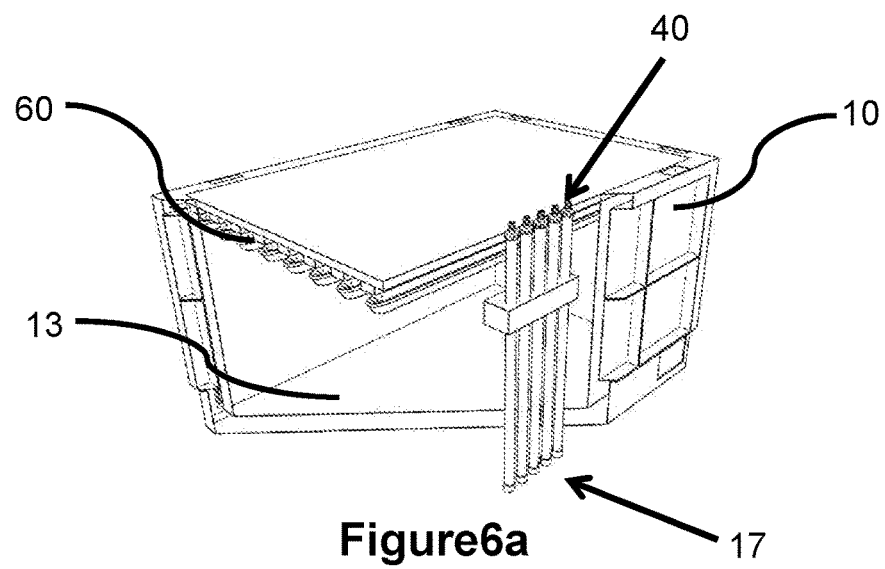
Figure 6B:
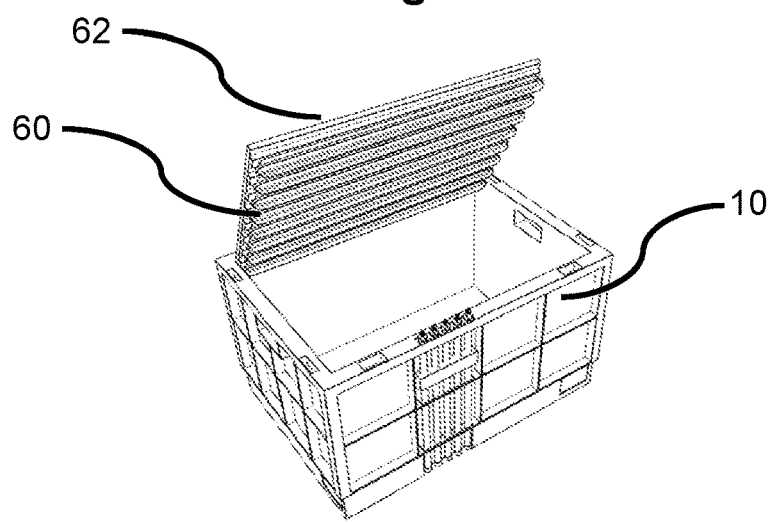
Figure 6C:
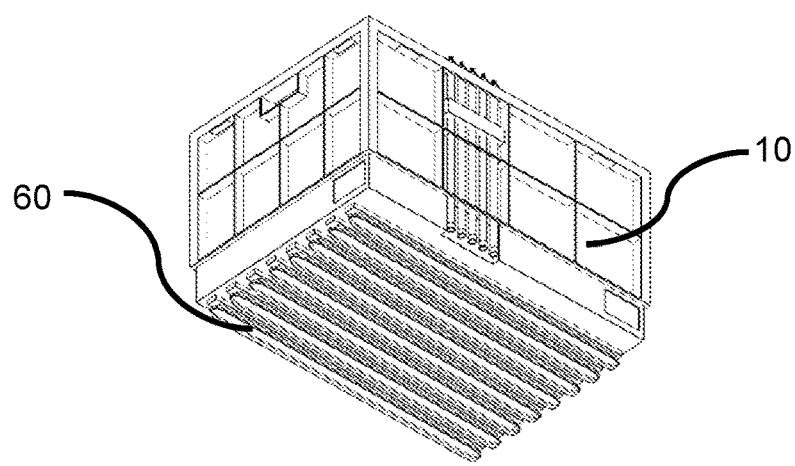
Figure 7:
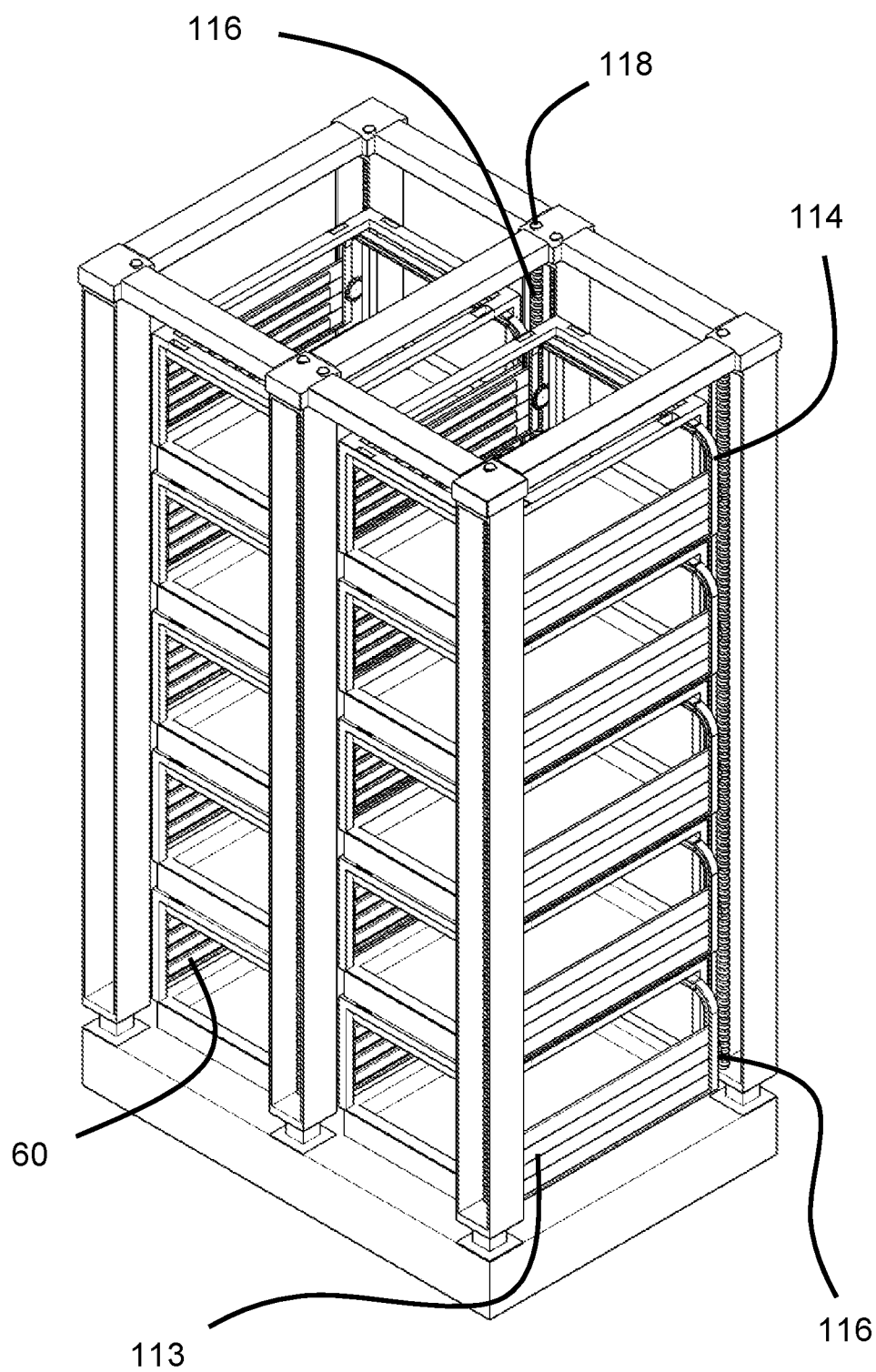
Figure 8:
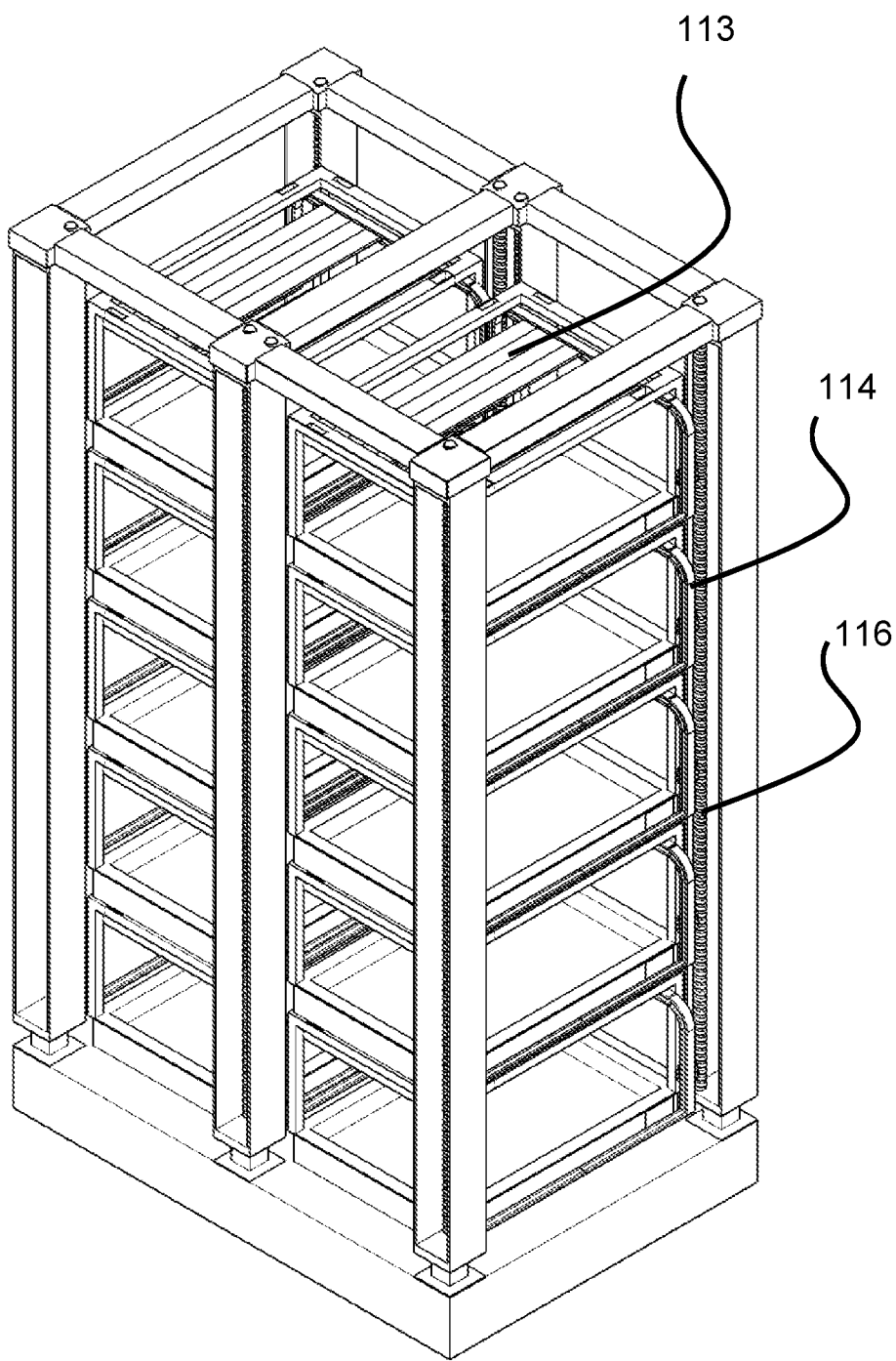
Figure 9:
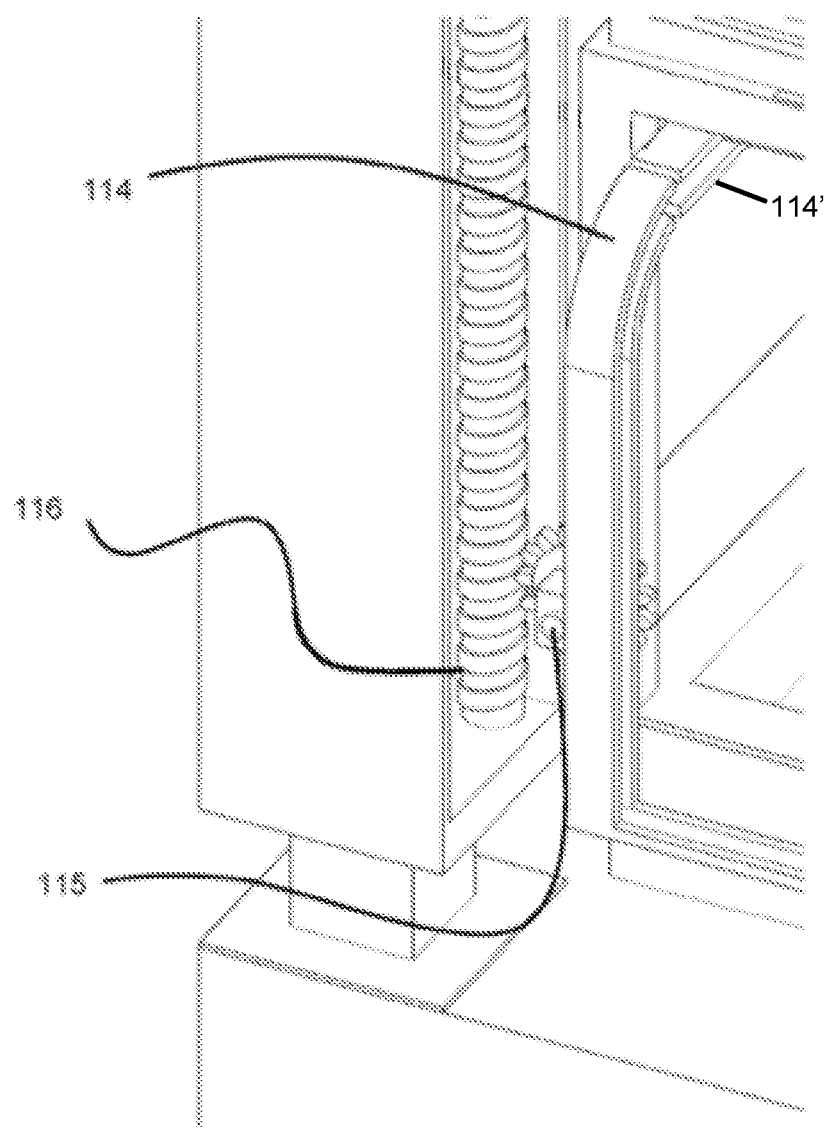
Figure 10:
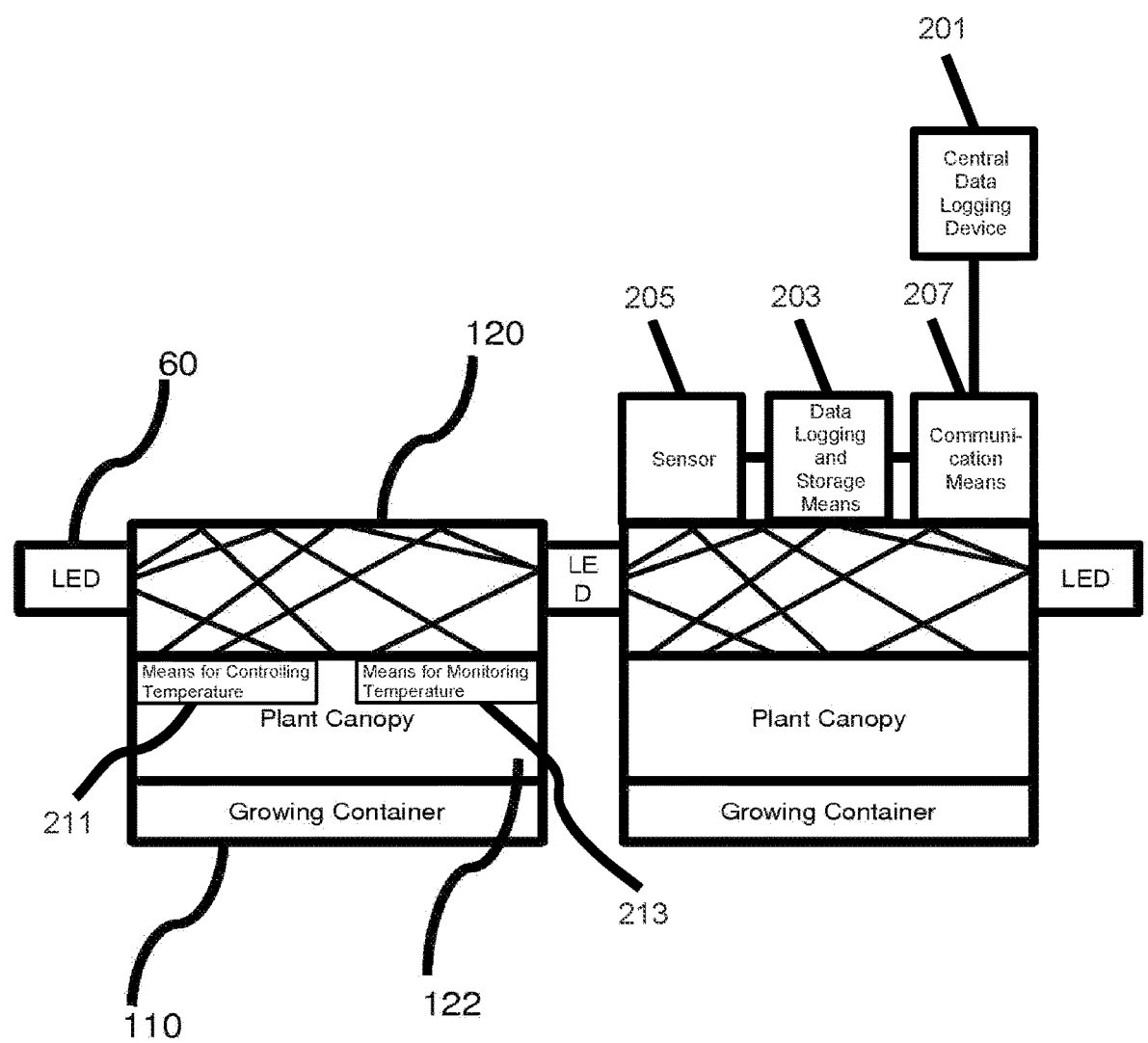

FIG. 5 is a schematic perspective view of one form of growing system, the system comprising a series of stacks of containers located within a framework, individual containers being removable from the stacks by load handlers (not shown), the system further comprising robotic picking means for picking plants growing in the containers stored in the growing system;

FIGS. 6a, 6b, 6c are schematic perspective views of one form of container for use in the growing system of FIG. 5, the container comprising lighting means FIG. 7 is a schematic perspective view of a portion of the system of FIG. 5 showing the uprights of the framework of the storage system, the uprights carrying a plurality of sliding panels moveably mounted on the uprights, the panels being moveable from a first inoperative position within the framework to a second operative position, wherein when in the second position the panels are located within individual containers;

FIG. 8 is a schematic perspective view of a portion of the system of FIG. 5 showing the uprights of the framework of the storage system with the containers stacked within the uprights, the panels of FIG. 7 being in the second, operative position within the containers;

FIG. 9 is a schematic, perspective, close-up view of one form of mechanism for moving the panels from the first position within the uprights to the second position within the container, the mechanism comprising a worm gear mechanism; and FIG. 10 is a schematic front view of a further form of the invention showing lighting means capable of achieving uniform light distribution across each container within a stack within the system.

As shown in FIGS. 1 and 2, stackable containers, known as containers 10, are stacked on top of one another to form stacks 12. The stacks 12 are arranged in a frame structure 14 in a warehousing or manufacturing environment. FIG. 1 is a schematic perspective view of the frame structure 14, and FIG. 2 is a top-down view showing a single stack 12 of containers 10 arranged within the frame structure 14. Each container 10 typically holds a plurality of product items (not shown), and the product items within a container 10 may be identical, or may be of different product types depending on the application.

The frame structure 14 comprises a plurality of upright members 16 that support horizontal members 18, 20. A first set of parallel horizontal members 18 is arranged perpendicularly to a second set of parallel horizontal members 20 to form a plurality of horizontal grid structures supported by the upright members 16. The members 16, 18, 20 are typically manufactured from metal. The containers 10 are stacked between the members 16, 18, 20 of the frame structure 14, so that the frame structure 14 guards against horizontal movement of the stacks 12 of containers 10, and guides vertical movement of the containers 10.

The top level of the frame structure 14 includes rails 22 arranged in a grid pattern across the top of the stacks 12. Referring additionally to FIGS. 3a, 3b and 3c and 4, the rails 22 support a plurality of robotic load handling devices 30. A first set 22a of parallel rails 22 guide movement of the load handling devices 30 in a first direction (X) across the top of the frame structure 14, and a second set 22b of parallel rails 22, arranged perpendicular to the first set 22a, guide movement of the load handling devices 30 in a second direction (Y), perpendicular to the first direction. In this way, the rails 22 allow movement of the load handling devices 30 in two dimensions in the X-Y plane, so that a load handling device 30 can be moved into position above any of the stacks 12.

Each load handling device 30 comprises a vehicle 32 which is arranged to travel in the X and Y directions on the rails 22 of the frame structure 14, above the stacks 12. A first set of wheels 34, consisting of a pair of wheels 34 on the front of the vehicle 32 and a pair of wheels 34 on the back of the vehicle 32, are arranged to engage with two adjacent rails of the first set 22a of rails 22. Similarly, a second set of wheels 36, consisting of a pair of wheels 36 on each side of the vehicle 32, are arranged to engage with two adjacent rails of the second set 22b of rails 22. Each set of wheels 34, 36 can be lifted and lowered, so that either the first set of wheels 34 or the second set of wheels 36 is engaged with the respective set of rails 22a, 22b at any one time.

When the first set of wheels 34 is engaged with the first set of rails 22a and the second set of wheels 36 are lifted clear from the rails 22, the wheels 34 can be driven, by way of a drive mechanism (not shown) housed in the vehicle 32, to move the load handling device 30 in the X direction. To move the load handling device 30 in the Y direction, the first set of wheels 34 are lifted clear of the rails 22, and the second set of wheels 36 are lowered into engagement with the second set of rails 22a. The drive mechanism can then be used to drive the second set of wheels 36 to achieve movement in the Y direction.

In this way, one or more robotic load handling devices 30 can move around the top surface of the stacks 12 on the frame structure 14 under the control of a central picking system (not shown). Each robotic load handling device 30 is provided with means for lifting out one or more containers or containers from the stack to access the required products. In this way, multiple products can be accessed from multiple locations in the grid and stacks at any one time.

FIG. 4 shows a typical storage system as described above, the system having a plurality of load handling devices 30 active on the stacks 12.

FIGS. 1 and 4 show the containers 10 in stacks 12 within a storage system. It will be appreciated that there may be a large number of containers in any given storage system.

FIG. 5 shows a growing system based on the prior art storage system depicted in FIGS. 1 to 4. In the growing system, growing containers 110 are adapted to be suitable for growing plants or other living organisms. For example, each growing container 110 may comprise a growing medium.

FIG. 5 shows a portion of the growing system described above. For clarity only a portion of the frame structure is shown with a representative number of containers 110 shown in a stack 12 within the frame structure 14. A portion of the containers 110 located within the system comprise growing means only in preparation for use. A portion of the containers 110 in the system comprise plants that have become too large for the spacing regime in which they were originally planted.

A robotic picking device 100 may be provided to fully automate this task. However, it will be appreciated that the task may be performed manually by operatives at the service area of the growing system.

Each growing container 110 may comprise a container 10 as shown in FIGS. 1 to 5 or alternatively may comprise a tray-like base with a supporting framework disposed above to enable the growing containers 110 to stack. Such growing containers 110 enable the growing canopy of the plant to be accessible through the sides of the container structure.

As the containers are stacked, it is the corner uprights of the container that carry the load of any containers stacked above any given container. Therefore, it is not necessary for the containers to have fixed or rigid sides. It will be appreciated that the growing containers 110 may comprise sides or partial sides to prevent crops from growing out of the growing container 110 volume.

FIGS. 6a, 6b and 6c show one form of a growing container 110 adapted to be suitable for growing plants. The plants are grown on growing means 13 such as matting or soil located in the containers 110. Beneath the matting 13 the container may comprise a reservoir 54 (not shown) the reservoir containing water and/or plant food suitable for the plant being grown in the container.

The containers 110 are held in stacks by co-operating surfaces on adjacent containers 110. The containers 110 additionally comprise connection means 40 positioned at the intended co-operating surfaces of the containers 110. The connection means 40 may comprise electrically conductive layers deposited on the co-operating surfaces of the containers 10 or may comprise sprung-loaded contacts or springs as contacts or any other connection means capable of carrying power between two or more containers 10. Furthermore, the connection means 40 may comprise carbon loaded rubber contacts capable of carrying signals between two or more co-operating containers 10 in a stack.

The connecting means 40 shown comprise releasably latching connectors capable of carrying power, fluids (such as water and fertilizers) and other services or utilities required in the plant growing system Individual containers 110 may comprise power supply means for supplying power to, for example, heating means, cooling means, data logging means, communication means and/or lighting means 60. Each individual container 110 may further comprise power control means for controlling the power to the or each service and controlling the power to other containers 10 in the stack 12 if power is to be transmitted to adjacent containers 10 in the stack 12. It will be appreciated that containers 10 comprising power control and control means are not limited to powering heaters, coolers or lights. Anything requiring power may utilize the power supply means. The power supply means may comprise batteries or may comprise means for transmitting power from an external power source through connection means 40 on the containers 10 or via the upright members 16 of the frame structure. Non-contacting methods of power transmission may also be used, for example magnetic induction or RF induction and optical methods.

FIGS. 6a, 6b and 6c show in detail a container 10 suitable for growing plant means. The container 10 comprises lighting means 60 which may radiate light of a predetermined wavelength suitable for growing a desired crop. Furthermore, the container 110 comprises fluid supply means 52 which when activated, may sprinkle a predetermined amount of water on the crops growing in the container 110. The power to the lighting means 60 and the fluid supply to the sprinkling means 52 are routed through the container 10 via routing means 17 that run along one side of the container 10. The container 110 is further provided with connecting means 40 to enable services to be routed up a stack 12 of containers 10 when the containers 10 are located in the growing system.

It will be appreciated that although in FIGS. 6a, 6b and 6c the routing means are shown as mounted on the container 10, it is possible to form a container 10 such that the container comprises mouldings suitable to act as routing means 17.

FIGS. 6a to 6c show a further forms of container 110 from the stack 12, the container 10 comprising various configurations of lighting means 60. As shown in FIGS. 6a and 6b, the lighting means 60 may comprise a lid containing suitable bulbs, LEDs or any other suitable form of lighting 60. The lid may be removably attached to the container 10 and fold away during removal of the container 10 from the stack 12.

Alternatively, as shown in FIG. 6c the lighting means 60 may be provided in the base of a container 110 to light the container 110 below in the stack 12.

FIG. 7 shows an alternative form of lighting arrangement in accordance with the invention. FIG. 7 shows a portion of the growing system comprising uprights of the frame structure 14. Located within the frame structure 14 are stacks 12 of growing containers 110. The growing containers 110 are of the type comprising a tray-like base and a box-type supporting framework mounted above to form a support for the growing container 110 in the stack 12.

It will be appreciated that the box-type framework of the growing container 110 may comprise a separate structure fixedly mounted on to the tray or may comprise an integrally formed structure with the tray-like base.

The growing container 110 further comprises a guide portion 114 on the upright members 16 positioned along two of the short sides of the growing container 110 at the top of the box-type support structure. The upright members 16 of the growing system frame structure 14 further comprise a guide portion 114' on the growing container 110 running substantially parallel to the upright members 16. The guide portion 114 and the guide portion 114' are positioned such that when a growing container 110 is located within a stack 12 within the frame structure 14, the two guide portions 114, 114' align. The two guide portions 114, 114' are joined by a radius portion of guide formed or mounted on the guide portion 114 on the uprights.

A plurality of panel members 113 are disposed within the guide portions 114, 114' and are moveable along the guide portions 114 on the uprights and into the guide portions 114' within the container 110. The panel members 113 comprise lighting means 60 that may emit light of suitable wavelengths for the crop or plant in the growing container 110.

FIG. 7 shows the panel members 113 comprising lighting means 60 located within the guide portion 114 on the uprights. The panel members 113 in FIG. 7 are positioned in a first position in which the surface of each of the panel members 113 comprising the lighting means 60 is substantially parallel to a long side of a growing container 110. The lighting means 60 may be inoperative when in this position. Alternatively, if the lighting means 60 are operative in this position, the growing containers 110 may be lit from the side in the case where the growing containers 110 do not comprise fixed or opaque sides.

The uprights further comprise a driven mechanism 115 such as, for example only, a worm gear mechanism. The worm gear mechanism comprises a threaded rod 116 mounted on the uprights and engaging means for engaging the panel members when located in the guides 114 on the upright. The engaging means is moved via the worm gear to move the panels 113 comprising the lighting means 60 from the first position within the guide portion 114, substantially parallel to the uprights, to the second position within the container 110 where the panel means 113 comprising the lighting means 60 are substantially perpendicular to the uprights of the frame structure 14. The mechanism 115 is shown in greater detail in FIG. 9.

In use, the panel members 113 comprising the lighting means 60 are moved from the position shown in FIG. 7 to the position shown in FIG. 8 by driving the worm gear mechanism. The mechanism 115 engages ribbon means (not shown) located within the guide portions 114, 114' on which the panels 113 are mounted and acts so as to move the panels upwardly in the guide 114 on the uprights, round the radius and along the guide 114' located within the growing container 110. When the panel members 113 are located in the guides 114' within the growing container 110 as shown in FIG. 8, the emitting surfaces of the lighting means 60 are disposed towards the growing volume 122 of the container 110. In this second position, the lighting means 60 are activated and act to light the plants or crops contained within the container volume in an even manner.

The mechanism 115 may be operable in response to a signal received from a load handling device (not shown) positioning itself above a given stack 12 of growing containers 110. Alternatively, the mechanism may be driven by the load handling device 30 via suitable locating and driving means 118 located on the top of the uprights. Furthermore, it will be appreciated that the mechanism 115 may be operable under remote control from a control center (not shown).

In this way, the growing containers 110 may be lit from above to facilitate uniform distribution of light and to enable the crops and plants to grow in a substantially upright manner, thereby eliminating the problem of crops and plants growing unevenly or at an angle to the upright caused by the directionality of the lighting. Additionally, the lighting means 60 are deployable when needed and may be returned to a storage position within the guides 114 on the uprights when not required. More particularly, the lights may be returned to this storage position when a growing container 110 is to be removed from a stack by a load handling device 30 operating on the tracks positioned above the frame structure 14.

It will be appreciated that whilst the above example and the Figures are described with the panel members 113 and lighting means 60 being positioned adjacent the long edge of the container 110, the system will work in a similar manner with the lighting means 60 positioned along the short edge of the container 110. Indeed the system will work if the containers 110 have a square cross section and the panel members and lighting means are positioned on either edge.

It will further be appreciated that the lighting means 60 need not comprise discrete lighting means on a series of panels 113, but may comprise a single light means on a flexible plate-type structure.

In an alternative embodiment of the invention, as shown in FIG. 10 the growing container 110 comprises a tray like base having a box-type support structure mounted thereon. The box-type structure together with the tray-like base defines a growing volume 122 in which the plant canopy forms. Each growing container 110 comprises a top or lid structure 120 comprising plastics material capable of internal reflection or refraction of light therein. For example, the top or lid structure 120 may comprise PMMA, Polycarbonate or Polystyrene or any other suitable material. The top or lid structure 120 may be positioned on top of each growing container or alternatively may form the base of each growing container 110 thereby being capable of lighting the growing container 110 below. It will be appreciated that a top or lid structure 120 may be independently removable from the top container 110 by the load handling device 30, particularly in the example where the base of the containers 110 comprises the lighting means 60. In this example, the top most container 110 would require an individual top or lid structure 120 to perform the lighting function.

It will be appreciated that the top or lid structure 120 may be independently removable from the top most container 110 by a first load handling device 30, a second load handling device 30 being subsequently used to lift the top most growing container 110 from the stack. However, individual load handling devices 30 may be provided with lifting means suitable for first lifting a top or lid structure 120 thereby disconnecting the lid and light array from any power supply, the lifting means subsequently lifting the growing container 110. Additionally, it will be appreciated that individual load handling devices 30 may be provided with lifting means suitable for lifting the container 110 with the top or lid structure 120 in situ, in this example, the load handling device 30 being provided with means for powering the lighting array in the top or lid structure 120 to maintain continuity of lighting if required.

Whilst the example shown in FIG. 10 shows a top or lid structure 120 of rectangular cross section, it will be appreciated that a shaped structure may improve the reflection properties and enable more light to be reflected and less to be scattered out with the structure. Advantageously, the provision of a transparent top or lid structure 120 enables the content of the growing volume 122 to be inspected either visually by an operator or via camera on a load handling device or within the growing system.

It will be appreciated that the top or lid structure 120 may comprise a mirrored surface (not shown) such that all the radiation incident thereon is reflected back towards the growing volume 122.

Lighting means 60 such as LEDs emitting light of a predetermined wavelength or a plurality of predetermined wavelengths are mounted aside the lid or base structures such that the radiation emitted is incident on the plastics top or lid structure 120 and lights the edges of the material, the light being refracted and reflected and emitted in a uniform manner over the growing canopy of the plants or crops.

In this way, uniform lighting distribution is achieved whilst maintaining a fixed lighting position on the side of the growing container 110.

In combination with the lighting mechanisms described above, individual containers 110 may further comprise other services, for example data logging means and communication means 207 for transmitting data recorded to a remote central data logging device 201. The data logging means 203 comprises sensors 205 suitable for monitoring the conditions in the container 10, for example the temperature, any gas emission, for example as a result of decomposing fruit, and humidity. The data logging means 203 and communicating means 207 enable the content and condition of individual containers 10 to be monitored. Furthermore, knowing information about specific containers 10 in the stacks 12 in the system enables the condition of the storage system as a whole to be monitored. It will be appreciated that the type and method of communication may be but need not be limited to WiFi. Any suitable form of communication protocol or method may be used.

Individual containers 110 in the stack 12, may further comprise heating and/or cooling means 211 and temperature monitoring means 213 for monitoring the temperature in the container 10. The heating means may comprise flow of hot fluid via direct means, for example hot air, or indirect means, for example radiator means or may further comprise electrical heaters or electromagnetic induction heaters.

The cooling means may comprise Peltier coolers or may comprise flow of cold fluid via direct means, for example cold air or via indirect means, for example radiator means, including ice slurry compressor driven.

In this way, the temperatures of individual containers 110 may be controlled and varied depending on the content of the individual container 110. If the contents of the container need to be chilled, then the individual container can have a temperature of 5 degrees C. maintained rather than requiring a portion of the stacks 12 in the storage system to be maintained at a predetermined temperature by space heaters and coolers. It will be appreciated that these are examples only and any suitable form of heater or chiller may be used to achieve the desired effect.

It may be preferable for air to be blown across the containers 10 within the stacks 12 of the plant growing system. This may be achieved by generating an airflow throughout the system either utilizing fans or other airflow means.

It will be appreciated that the upright members 16 of the grid of the growing system may carry any of the services referred to herein or alternative services for onward transmission to the containers 10 by wires, cables or pipes or any other suitable means.

UK Patent Application Numbers GB1606678.9, GB1606684.7 and GB1606679.7 detail systems and methods of routing services through containers 10 and frame structure 14, and are hereby incorporated by reference.

Given the highly automated and controlled nature of the system a large number of uses are envisaged. Some of these are described below but should not be considered limiting.

The system may be used for development of new variants of plants, for example, or if optimal growing conditions for given variants are being established then the use of the system will require continual monitoring and all conditions within each container will require separate parameters to be checked and the contents regularly inspected. The amount of water, nutrients and light will need to be closely monitored and varied accordingly. This will require many containers to be removed, inspected and replaced at intervals. Advantageously, this can be achieved in the present system as the process of sensing, monitoring and removal of containers 10 from the system is highly automated.

If the system is to be used for mass production of given plants or crops, the cost of production needs to be minimized and therefore the required parameters for optimum growth will have previously been established. Therefore, the lighting, water, nutrients and temperature required for each plant or crop variety will be fixed at the beginning of the growth cycle. The containers will only be removed from the storage system every 3 to 10 days for the seedlings to be re-spaced and then ultimately harvested and the containers 10 re-seeded.

Advantageously, it is possible for both types of uses to be accommodated in a single storage system. A portion of the containers 10 may contain crops for mass production, a portion of the containers may contain products under development or new variants being monitored and optimal growth protocols being established.

It will be appreciated that a portion of the system may be partitioned by suitable partition means In the examples described herein, it will be appreciated that not all containers 110 comprise all the services described. Furthermore, some containers, particularly if used for mass production, may not require any services other than the appropriate levels of light, water and nutrients. Conversely, for containers 110 being utilized in research and development or trials, more of the sensing and monitoring means may be required in each container.

In the case of a research and development container, at regular intervals the container or containers 10 are removed from the stacks 12 by the load handling device 30 and taken to an inspection port within the system. The condition of the plants is checked and nutrients or water added to the container as required. If the plants within the container still require time to achieve maturity, the container 10 is returned to the stacks 12. If the plant has grown sufficiently and the crop is ripe, the plants or crops are removed and the container 10 is cleaned and replanted and then returned to the stacks 12.

In the case of mass production, the relevant containers 10 may not be removed for inspection, but may only be removed when the crop is expected to have reached maturity.

The sensor means provided within the containers 10, monitor the condition of the plants growing therein. Whilst a schedule of maintenance of the plants in the containers 10 may be used, it will be appreciated that the sensors may trigger a container 10 being removed from the stacks 12 outside of the maintenance schedule. For example, if a container 10 contains growing mushrooms but the mushrooms are over ripe a sensor may detect a gas associated with food ripening and the container 10 may be removed outside of the maintenance schedule for inspection.

Certain greenhouses operate in an atmosphere with elevated levels of CO2. It will be appreciated that in these situations, suitable gas sensing means would be able to monitor and control the levels of CO2 accordingly.

It will be appreciated that many crops may be grown in such mechanized greenhouses. These include but are not limited to mushrooms, chillies, herbs, and lettuce. In some places, where energy is abundant but water scare this kind of system could also be used to grow cereal crops and other living things. Whilst the embodiments described here refer mainly to plant growth either for mass production or research and development purposes, it will be appreciated that any living organism, plant, animal or fungi could be grown in such a storage system. For example, the storage system could be used for the growth of fish, chickens, oysters, and lobsters. Additionally, the system could be used for GM trials, pharmaceutical trials, the storage of wine that needs specific maturing conditions, or cheese that need careful temperature and humidity control.

It is an advantage of this system of growing crops, that multiple crops may be grown in a single location, as different containers 10 may contain different crops. Furthermore, growing the plants in containers 10 prevents the spread of disease through a large crop as disease, blight, fungus or other plant related problems will be confined to individual containers 10. Whilst it should be possible to limit the infestation from the outside environment through filters in the system warehouse, any breach of this could be contained in individual containers, such that "plant related problems" could be minimized.

It will be appreciated that the growing system comprises a large number of containers 10 arranged in stacks 12. In one embodiment of the invention, the storage system comprises containers 10 of different categories dispersed within the system. For example, there may be empty containers 10, containers 10 growing plants, containers 10 containing goods to be stored, containers containing services such as power supplies or communications means, containers 10 comprising heating means, containers 10 comprising cooling means, containers 10 comprising goods requiring liquids and/or light.

It will be appreciated that some containers 10 may contain one or more of the services or devices referred to above. For example a container 10 with a reservoir 54 may also be provided with lighting means 60.

The lighting means 60 may take the form of LED lights or fluorescent tubes or any other suitable form of lighting.

The provision of data logging and condition monitoring means in containers 10 within the stacks 12 enables a map of the condition and topography of the system to be generated that would not otherwise be possible unless specific containers 10 were removed and examined.

Furthermore, providing services to specific individual containers 10 either via the upright members 16 or via container-to-container contacts, enables goods having different requirements to be stored within the same storage system without resorting to portioning the system and separating goods with different requirements in to separate sections of the grid.

Additionally, connections between containers 10 and communications between containers 10 and stacks 12 will generate a knowledge base of the storage system in real time that will assist in the event of a power outage for example, that will aid in possible disaster recovery. The alternative would be to empty all the containers and rebuild the stack which would be inefficient and costly.

It will be appreciated that all containers 10 may be removed from the stacks 12 by the load handling devices 30. No container 10 is fixed in a position and all contacts are makeable and breakable between the containers 10. Furthermore, containers 10 requiring services being passed through the upright members 16 are not fixed to the upright members 16 in any way. Any suitable make and break connection may be used.

It will further be appreciated that individual containers may be provided with one service, a selection of services or all service described. Furthermore, the services listed should not be regarded as limiting. Any form of service that is capable of being carried or transmitted to a container 10 may be envisaged.

In one embodiment of the invention, given for example only, the containers 110 comprise trays on which the plants are grown. The trays are approximately 1000×1400 mm. The trays comprise a frame, tall enough to allow the plants to grow to their natural harvesting height. In the specific embodiment, trays are stacked up to 20 m tall or more. Each tray is lit, either from lights attached to the top frame of the tray, from the base of the tray above or from lights in the grid as shown in example form only in FIGS. 6a to 6c above. All processing (planting, harvesting, pruning, spraying and potentially watering) is undertaken at specialized work stations with good ergonomics and potentially robots or other automation.

It will be appreciated that a plurality of different lighting arrays may be used. For example different arrays may be used during the early part of the plant's growth than to the end of plant growth. In the beginning stages, focusing all light on the plant and reducing the waste of lighting the surrounding soil would be preferable. Separate arrays may be utilized or a portion of lights may be switched off. Therefore, the lighting means 60 may be moveable with reference to the crop growing in the container 10. For example, should the crop grow in height, the level of the lighting means 60 may be raisable and lowerable relative to the height of the crop in the container 110. Furthermore, the growing containers 110 may be provided with spacer collars to enable the growing volume of the growing container 110 to be increased. It will be appreciated that the top or lid structure 120 may be suitable formed to co-operate with such spacer collars or vice versa, the lighting means being separable from the spacer collars and replaced on growing containers 110 if required. It will be appreciated that spacer collars may stack on growing containers 110 and vice versa and that top or lid structure 120 may fit containers 110 or spacer collars.

It will also be appreciated that multiple wavelengths of light may be used at any one time or discrete wavelengths maybe used in a predetermined sequence. In both of the examples above, the lighting means 60 may comprise multiple individual light sources in an array or may comprise lighting means that are interchangeable during use.

In a further embodiment, the plants may be grown upside down and lit from below. Advantageously, this would reduce the energy expended by the plant to move water and nutrients against gravity and may make some species grow faster.

Many variations and modifications not explicitly described above are also possible without departing from the scope of the invention as defined in the appended claims.

The invention claimed is:

1. A growing system comprising:
  a first set of substantially parallel rails or tracks;
  a second set of substantially parallel rails or tracks extending transverse to the first set in a substantially horizontal plane to form a grid pattern having a plurality of grid spaces;
  a plurality of containers arranged in stacks, located beneath the grid spaces and within a series of uprights forming a framework;
  at least one load handling device disposed on the first set of substantially parallel rails or tracks and/or the second set of substantially parallel set of rails or tracks and arranged to move laterally above the stacks, each load handling device having a lifting device arranged to lift at least one container of the plurality of containers, or part thereof, from a stack of the stacks; and
  a series of lights deployable between:
    a first position, disposed within first guide portions of the framework attached to two uprights of the series of uprights and along a sidewall of the at least one container in the stacks which is arranged between the two uprights; and
    a second position, disposed within second guide portions of the at least one container positioned within the at least one container at the top of a container location thereof, wherein the first and second guide portions are positioned to align when the at least one container is located in a given stack within the framework;
  such that light emitted by the series of lights will be evenly distributed across a growing volume of the at least one container.

2. A system according to claim 1, comprising:
  a mechanism, the series of lights being configured to be moveable from the first position to the second position by the mechanism, which is located on the uprights of the framework.

3. A system according to claim 2, wherein the mechanism comprises:
  a guide located on the uprights, the guide guiding the series of lights.

4. A system according to claim 3, wherein the series of lights comprise:
  a panel engaging with the guide located on the uprights.

5. A system according to claim 4, wherein the mechanism comprises:
  a worm gear mechanism, said worm gear mechanism having a threaded rod located on the uprights, and an engaging means having a toothed wheel for engaging the panel.

6. A method of growing organisms within a growing system comprising:
  a first set of substantially parallel rails or tracks;
  a second set of substantially parallel rails or tracks extending transverse to the first set in a substantially horizontal plane to form a grid pattern having a plurality of grid spaces;
  a plurality of containers arranged in stacks, located beneath the grid spaces and within a series of uprights forming a framework;
  at least one load handling device disposed on the first set of substantially parallel rails or tracks and/or the second set of substantially parallel set of rails or tracks and arranged to move laterally above the stacks, each load handling device having a lifting device arranged to lift at least one container of the plurality of containers, or part thereof, from a stack of the stacks; and
  a series of lights deployable between:
    a first position, disposed within first guide portions of the framework attached to two uprights of the series of uprights and along a sidewall of the at least one container in the stacks which is arranged between the two uprights; and
    a second position, disposed within second guide portions of the at least one container positioned within the at least one container at the top of a container location thereof, wherein the first and second guide portions are positioned to align when the at least one container is located in a given stack within the framework;
  such that light emitted by the series of lights will be evenly distributed across a growing volume of the at least one container,
  the method comprising:
    a. providing growing means within the at least one container;
    b. positioning the at least one container within the growing system;
    c. providing light, water and nutrients to the at least one container; and
    d. moving the at least one container using the at least one load handling device operable on the grid pattern above the plurality of containers, wherein the light is provided via the series of lights that is deployable from the first position adjacent the sides of the at least one container to the second position within the at least one container.

7. The method according to claim 6, comprising:
  a. providing a sensor, and data logging and storage means, within either the at least one container having the growing means or a separate container of the plurality of containers;
  b. providing communication means to communicate data which has been logged to a central data logging device;
  c. monitoring the data received; and d. removing the at least one container having the growing means, during a growing cycle of an organism within the at least one container, to provide water and nutrients.

8. The method of growing organisms according to claim 6, comprising:
providing means for controlling a temperature within the at least one container having the growing means; and
providing means for monitoring the temperature within the at least one container having the growing means.

9. The method of growing organisms according to claim 6, comprising:
emitting light of a predetermined wavelength from at least one light of the series of lights for the organisms being grown in the at least one container having the growing means.

10. The method of growing organisms according to claim 6, comprising:
varying a length of time the light is emitted to simulate an appropriate day length for the organisms being grown in the at least one container.

* * * * *